(12) United States Patent
Arcan

(10) Patent No.: US 7,946,841 B2
(45) Date of Patent: May 24, 2011

(54) DEVICE FOR CONVEYING A TUBULAR FILM

(75) Inventor: Metin Arcan, Lengerich (DE)

(73) Assignee: Windmoeller & Hoelscher KG, Lengerich (DE)

( * ) Notice: Subject to any disclaimer, the term of this patent is extended or adjusted under 35 U.S.C. 154(b) by 0 days.

(21) Appl. No.: 11/578,555

(22) PCT Filed: Apr. 7, 2005

(86) PCT No.: PCT/EP2005/003640
§ 371 (c)(1),
(2), (4) Date: Oct. 16, 2006

(87) PCT Pub. No.: WO2005/102666
PCT Pub. Date: Nov. 3, 2005

(65) Prior Publication Data
US 2007/0246198 A1    Oct. 25, 2007

(30) Foreign Application Priority Data
Apr. 14, 2004  (DE) .................. 10 2004 017 952

(51) Int. Cl.
*B29C 53/20* (2006.01)
(52) U.S. Cl. ........ 425/445; 425/326; 226/174; 226/177; 165/120

(58) Field of Classification Search ............... 425/445, 425/326.1; 226/174, 177; 165/120
See application file for complete search history.

(56) References Cited

U.S. PATENT DOCUMENTS

| 3,116,787 | A | * | 1/1964 | Campbell .................. 165/90 |
| 3,340,565 | A | * | 9/1967 | Holly ...................... 425/445 |
| 3,768,949 | A | * | 10/1973 | Upmeier ................... 425/392 |
| 4,105,386 | A | * | 8/1978 | Thiel et al. ................ 425/217 |
| 4,676,728 | A | * | 6/1987 | Planeta .................... 425/387.1 |
| 5,458,841 | A |   | 10/1995 | Shirrell |

FOREIGN PATENT DOCUMENTS

| EP | 0 531 021 A1 | 3/1993 |
| GB | 1 320 552 | 6/1973 |
| GB | 2 201 371 A | 9/1988 |

* cited by examiner

*Primary Examiner* — Jeff H Aftergut
*Assistant Examiner* — Jaeyun Lee
(74) *Attorney, Agent, or Firm* — Jacobson Holman PLLC

(57) ABSTRACT

A device for the transportation and chilling of a film tube extruded shortly before has at least one first pair of rollers, through the clearance between which rollers, the film tube enters into a chilling area, and a second pair of rollers, through the clearance between which rollers, the film tube leaves the chilling area. Thereby the film tube can discharge heat to its environment between the first and the second roller pair.
The path length that the film traverses between the first roller pair and the second roller pair is variable.

7 Claims, 4 Drawing Sheets

DEVICE FOR CONVEYING A TUBULAR FILM

CROSS-REFERENCE TO RELATED APPLICATION

This is a nationalization of PCT/EP2005/003640 filed 7 Apr. 2005 and published in German.

BACKGROUND OF THE INVENTION

1. Field of Invention

The invention relates to a device for the transportation of a film tube in which the film tube is guided by at least one first film guide element, at least one second film guide element, and at least one third film guide element such that the film tube can discharge heat to the surrounding environment in the area of the film guide elements.

2. Description of the Prior Art

A device of this kind is already known. It is used in general in equipment for the production of film tubes or film sheets. Plastic materials in granulated form are fed into such equipment, which are then plasticized into a viscous mass under the action of high pressure in the extruder. This mass, which has a high temperature due to the pressure, is formed into a ring-like form in a die head and comes out of the die head through a tubular die. The mass forms a film tube already immediately after leaving the tubular die. After passing through a so-called calibration basket, the film tube is guided along by the other film guide elements, which flatten the tube. Frequently, this flattening unit feeds to a pre-squeezer of the film tube, so that it forms an almost double-layered film sheet. The pre-squeezer consists mostly of a pair of rollers, through the clearance between which rollers, the film passes through. The pre-squeezer is followed by a squeezer, in which from the film tube finally a double-layered film sheet is formed. The distance from the pre-squeezer to the squeezer is so dimensioned that the film sheet can release the heat stemming from the extrusion process in course of the transport between the roller pairs. The film tube is thus additionally cooled in this manner, so that it can be processed further. This includes, for example, the separation of the film tubes, so that two film sheets are formed, and/or the winding of the film tube or the film sheet. This type of cooling of the film tube can, however, take place in general at least between two arbitrary film guide elements.

The only requirement is that there is a possibility that the film tube can discharge the heat to its environment.

In known devices of this type, there is however frequently the problem that—depending on the film type and the thickness of the film—the film tube cannot cool down between the two guide elements adequately for the subsequent processing. In particular, if it is not adequately cooled, it can result in sticking together of the double-layered film sheet, so that a subsequent drawing apart, for instance during the production and the filling of the bags made from the film tube, is not or no longer possible without damage. On the other hand, too much cooling of the film can lead to undesired stiffness of the same, so that it tends to develop folds or ruptures in course of the subsequent processing steps.

SUMMARY OF THE INVENTION

The aim of the present invention is therefore to make a device for the transport of a film tube in which almost all types of film tubes can be cooled during the transport in such a manner that they can be properly processed in the subsequent stages.

According to the invention, this problem is solved by the features of the device described herein. According to that, the distance between the film guide elements, at least two of which are provided, is variable. In this manner, the region, in which the film tube can discharge heat to its environment, can be enlarged or reduced, and can thus be adjusted according to the type of the film. Film guide elements can thereby be, for instance, the rollers of the pre-squeezer or squeezer, as well as also the deflecting guide rollers, turning bars, spreader rollers, which can be arranged at any arbitrary location in the device between the die head and the winding position. Especially important thereby is that contactless film guide elements are also provided, with which an air padding is generated, on which the film tube is then guided. These are used, for example, in calibrating baskets.

It is especially advantageous, if the distance between the film guide elements, at least two of which are provided, is continuously variable. Appropriate reaction to the smallest changes in the production parameters is thus possible, for example, when there is a change in the thickness of the film, by adjusting the distance between the film guide elements according to the new requirements for the cooling.

In a preferred embodiment of the invention, the first and/or the second film guide element can be designed to enable its displacement or traversal relative to the machine frame.

In an especially advantageous embodiment of the invention, the first film guide element is an integral part of a first roller pair 16, through the clearance between which rollers, the film tube 6 enters into a chilling area, and that the second film guide element is an integral part of a second roller pair 17, through the clearance between which rollers, the film tube 6 leaves the chilling area. The first roller pair is frequently also called the pre-squeezer 22, the second roller pair called the squeezer 23. This type of arrangement of the roller pairs is frequently used for guiding a film tube with high stiffness. These types of film tubes are used in processing machines for forming, filling and sealing of sacks or bags (the so-called FFS machines).

In a device according to the invention, the roller pair 17 for the squeezing can, for example, be displaced relative to the machine frame and thus, relative to the roller pair for the pre-squeezing 16.

In another embodiment of the invention, at least one more film guide element is provided, whose distance to the first and/or the second film guide element is variable. As a result, it is possible to guide the film tube along the direct path between both the first film guide elements, or alternatively, also via another film guide element. In which case, at least one more film guide element can be arranged in such a manner that, when required, it is not in contact with the film tube. The film tube can thus be guided along the direct path between the first and the second film guide element. This is especially advantageous, if at the time of the beginning of the production, the starting part of the film tube is drawn automatically by means of the film guide elements. The next film guide element can be brought into contact with the film tube only after the beginning of production and can then facilitate the variable chilling of the film tube.

In a preferred embodiment of the invention, at least two more film guide elements are provided, which can be moved relative to the first and/or the second film guide element. The two additional film guide elements can thereby be also movable relative to each other. It is thus not only possible to extend the length of path of the film tube between the first and the second film guide element and thus increase the quantity of heat to be removed, but also to increase the winding area of the film tube around the film guide elements. This is especially of advantage, if the film guide elements support cooling of the film tube.

In yet another embodiment of the invention, at least two more film guide elements are mounted in at least one holding device. The holding device can in that case be movable relative to the first and/or the second film guide element. The other film guide elements are not displaceable relative to the holding device. If two additional film guide elements are designed as cylinders, they can be driven simply by means of a single drive.

It is of advantage, if two holders are provided, which are mounted rotatably in the machine framework. The film guide elements can thereby be arranged at the same distance with respect to the rotation axis of the holding devices and at maximum distance with respect to each other. With this arrangement, the chilling of the film tube can be improved in a simple manner. Starting from a direct path of the film tube through the device, the holder can now be rotated. After a certain angle of rotation, the other film guide elements come into active contact with the film tube. With further rotation, the film tube winds more and more around the other film guide elements. At the same time, the other film guide elements recede to a distance that becomes greater and greater with respect to the first and the second film guide elements, for instance, from the pre-squeezer and the squeezer. The distance covered by the film tube between the first and the second film guide element keeps on increasing with increasing rotation angle till an end point is reached, at which the film tube comes in contact with itself.

To adjust the angle of rotation, at least one of the holders is equipped with a driving device. This can be, for instance, an electrically driven step motor.

In another embodiment of the invention, at least one of the mentioned film guide elements is designed as a chill roller. In this feature, this roller can additionally cool the film tube. In that design, a cooling medium can be passed at least partially through the roller. At least one of these chill rollers can be a film guide element of the pre-squeezer, squeezer or one of the additional, at least one, film guide elements.

Further exemplary embodiments of the invention follow from the objective description, claims and the drawing.

BRIEF DESCRIPTION OF THE DRAWINGS

The individual figures show.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
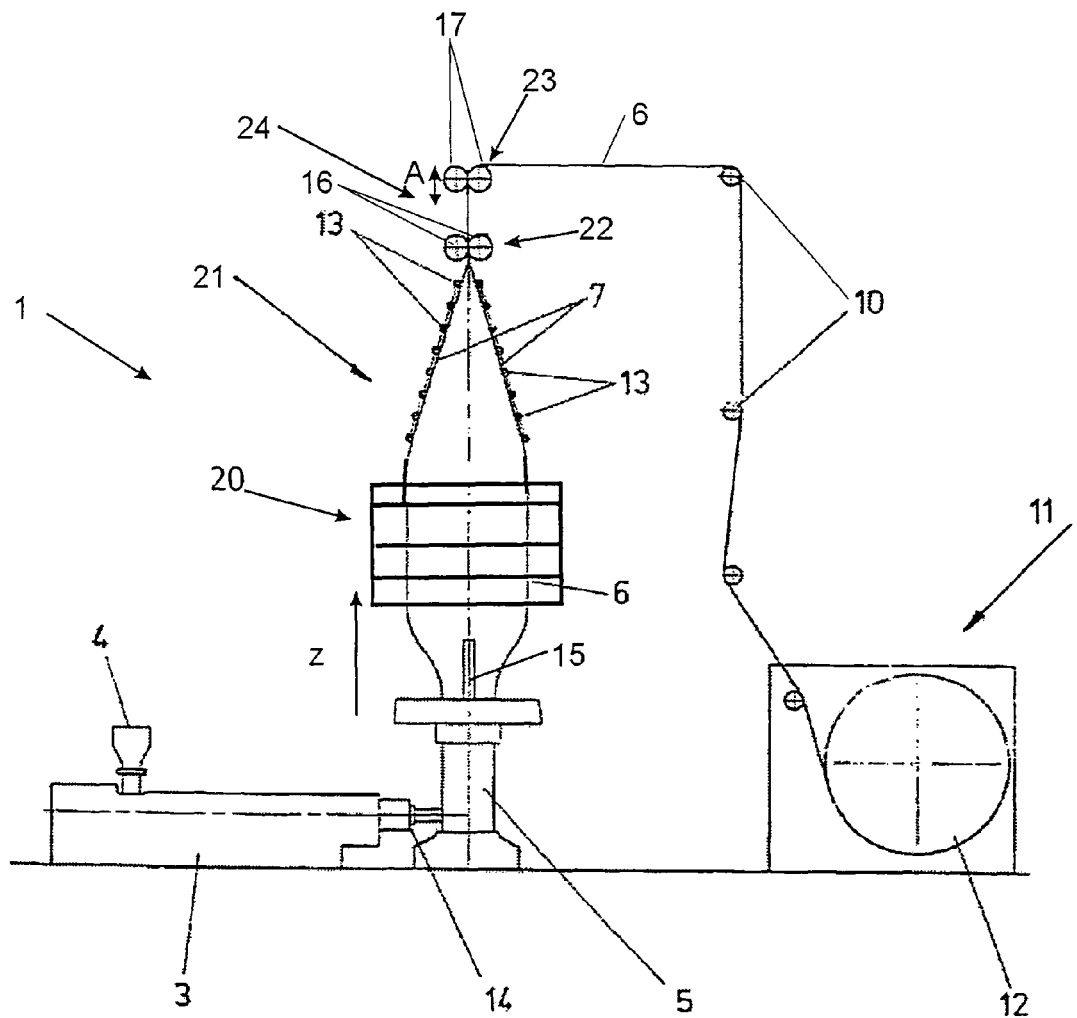
FIG. 1 View of a blow film extruder with a device according to the invention
FIG. 2 An exemplary embodiment of a device according to the invention
FIG. 3 Another exemplary embodiment of a device according to the invention
FIG. 4 Perspective view of a section from FIG. 3

FIG. 1 shows the familiar blow film extruder 1, but with a device according to invention for the transport and the chilling of the film tube.

A plastic material is fed to the filling connection 4, which is thereafter plasticized in the extruder 3. The generated mass is fed through a connecting conduit 14 to the die head 5, which forms the film tube 6. Thereby the film tube 6 leaves the die head 5 through a tubular die, not visible here, in the direction of the transport z. Due to the compressed air fed through the ventilation muff 15, the film tube 6 expands immediately after leaving the die head 5. The diameter of the film tube 6 is however limited by the calibration basket 20. After leaving the calibration basket 20, the film tube 6 reaches into a flattening unit 21, in which the film tube is nearly formed into a double-layered film sheet. The film tube 6 is thereby guided between the pairs of the guide elements 13, which are mounted on the roof-shaped plates or carriers 7, so that they 13 assume a lesser and lesser distance from each other in course of the traversal along the direction of transport z.

After passing through the flattening unit 21, the film tube 6 reaches the device 24 for the transport and the chilling. There, the film tube 6 is first fed to the pre-squeezer 22 consisting of a pair of pre-squeezer rollers 16. The complete flattening takes place through the squeezer 23 consisting of a pair of squeezer rollers 17. The film sheet 6 can thereupon be guided through a reversing device, not shown here, or can be fed, as in the case of the shown device, directly through the deflecting guide roller 10 of a winding device 11, where the film sheet 6 is processed to form a spool 12.

The squeezer rollers 17 serving the purpose of a squeezer are mounted displaceably, not shown here, in the machine frame, so that they 17 can be moved along the direction indicated by the double arrow A. In this manner, the path length between the pre-squeezer 22 and the squeezer 23 can be varied in such a manner that the film tube 6 can cool adequately.

Figure 2:
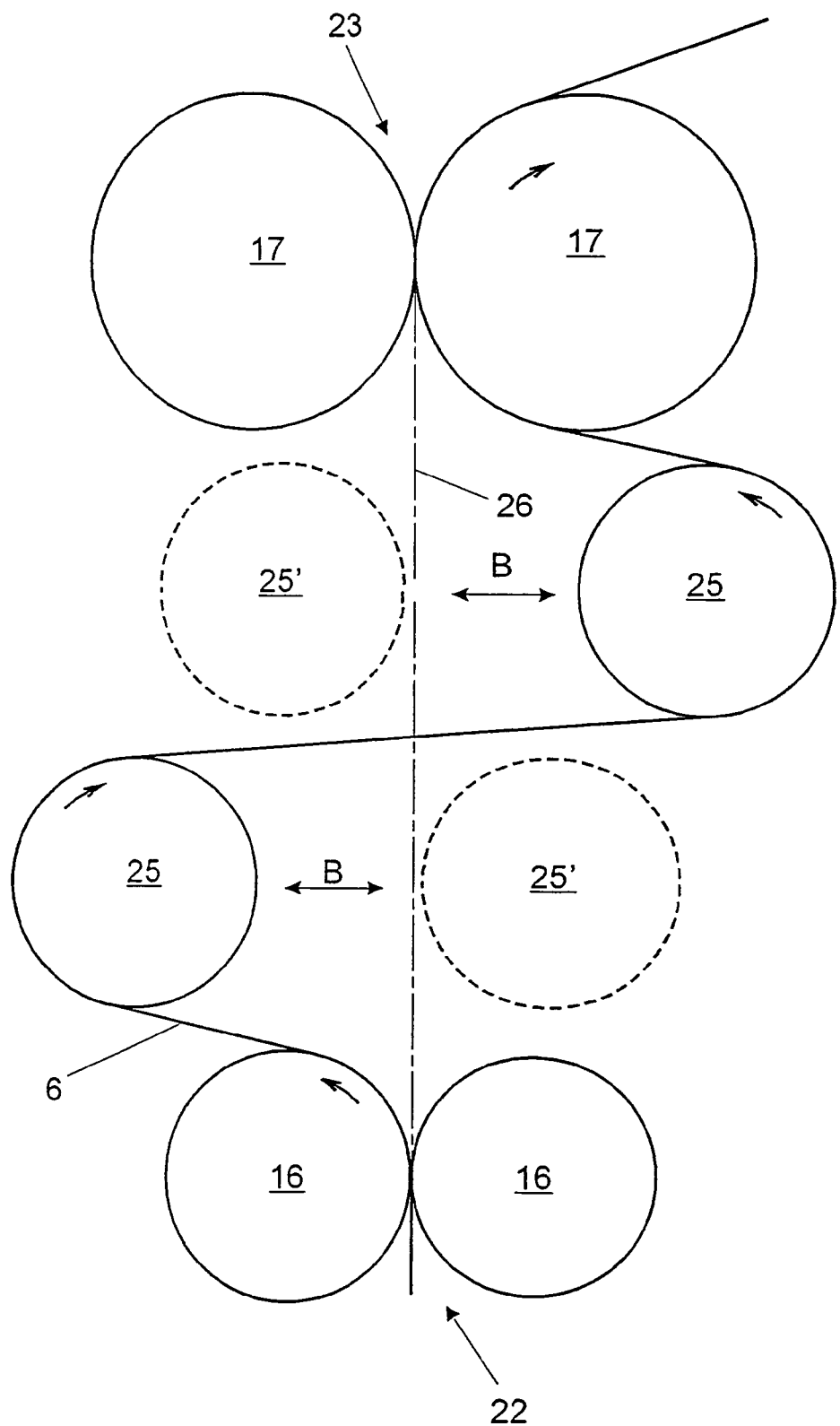

FIG. 2 shows another exemplary embodiment of a device 24 according to the invention for the transport and the chilling of the film tube 6. This one comprises, besides the pre-squeezer roller 16 and the squeezer roller 17, other rollers 25. These other rollers 25 are mounted in the machine frame in such a manner that their traversal is linear. In the example shown, they are movable along the double arrow B. The position of the line of the displacement is however not limited to the example shown in the figure. For each roller 25, there can be independent directions of movement. In the position of the roller denoted by 25' (dashed part in the diagram), the rollers are not yet in contact with the film tube 6. In which case, the film tube 6 is guided along the direct path 26 between the pre-squeezer 22 and the squeezer 23. Now if the rollers 25 are displaced, the film tube 6 winds more and more around the rollers with the increasing displacement distance. Furthermore, the path length between the pre-squeezer 22 and the squeezer 23 traversed by the film tube becomes greater. Due to the mutually opposite sense of the displacements of the rollers 25, as shown in FIG. 2, this effect is reinforced even further.

Figure 3:
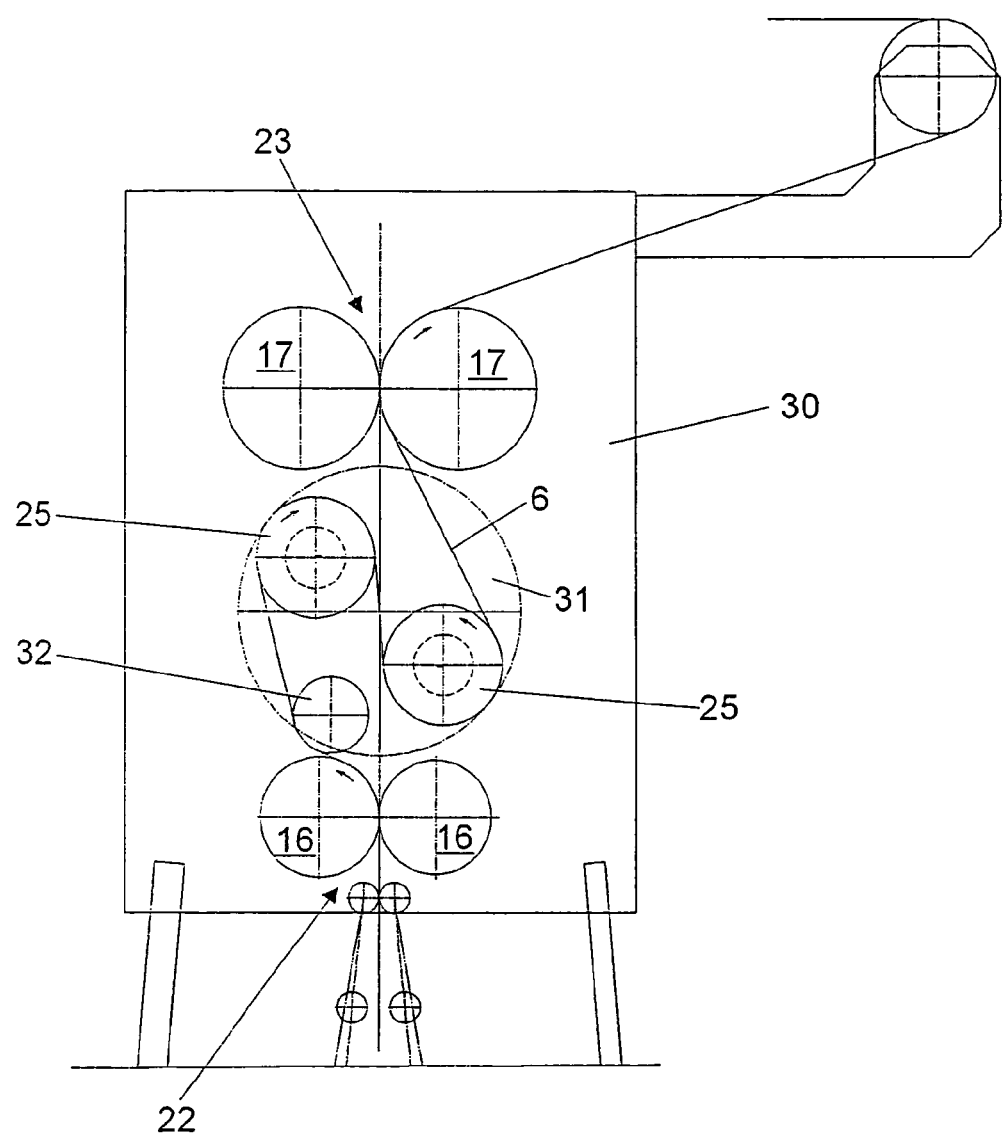
Figure 4:
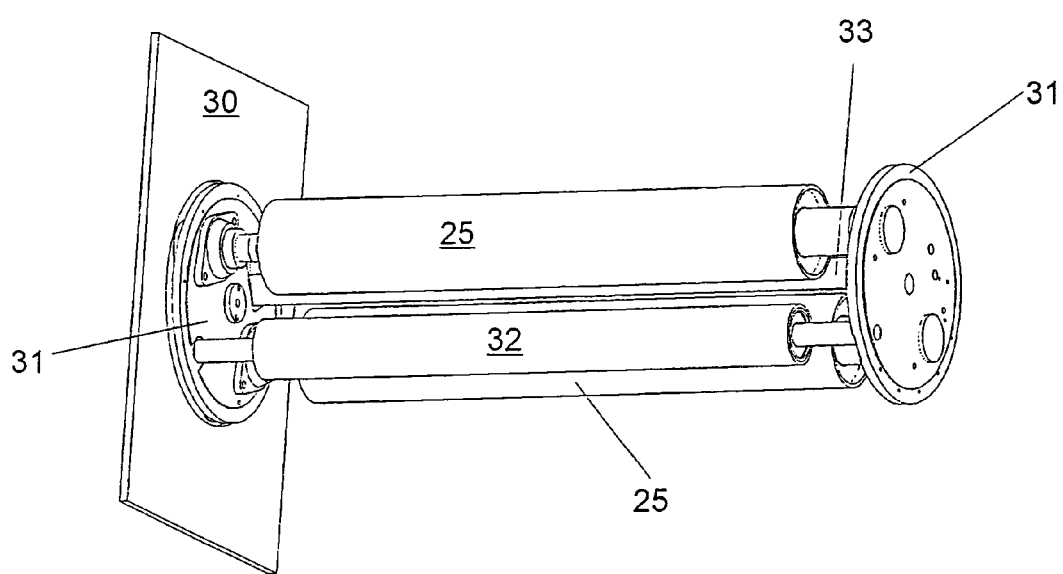

The embodiment shown in FIGS. 3 and 4 comprises a frame 30, whose front frame plate is not shown for the sake of better overview. In this frame 30, the pre-squeezer 22 is mounted with the pre-squeezer roller 16 and the squeezer 23 is mounted with the squeeze roller 17. In each frame plate of the frame 30, additionally a wheel 31 is mounted rotatably. For the synchronization of their rotation, both wheels can be connected with a cross beam 33. In each wheel 31, one end of each roller 25 is mounted rotatably. In addition to that, parallel to the roller 25, one or more deflecting guide rollers 32 can be provided. However, only the rollers 25 are designed to serve as the chill rollers. For the rotation of the wheel 31, a drive, not shown here, is provided.

The rollers 25 can be driven as described in the following. The rollers 16 and 17 can be driven with a single drive using devices for the transmission of torque, not shown here, such as, for instance, belts or chains.

These belts or chains can actuate a toothed wheel or another wheel, also not shown here, whose axis of rotation lies on the axis of rotation of the wheel 31, but is rotatable relative to the wheel 31. The toothed wheel or the other wheel transmits the torque to a second toothed wheel or yet another wheel, which thereupon drives the rollers 25 by means of the other belts or chains. During the rotation of the wheels 31, the additional belts or chains need not be adjusted, because, as already described, the rollers 25 have a constant distance with respect to the axis of rotation of the wheels 31. The described arrangement enables, also with relatively movable rollers 25 for the pre-squeezing or the squeezing, to set all the rollers 16, 17, 25 into rotation through a single drive. Such a construction is economical.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of Reference Symbols | |
|---|---|
| 1 | Blow film extruder |
| 2 | |
| 3 | Extruder |
| 4 | |
| 5 | Die head |
| 6 | Film tube |
| 7 | Carrier |
| 8 | |
| 9 | Film tube |
| 10 | Deflecting guide roller |
| 11 | Winding device |
| 12 | Spool |
| 13 | Guide element |
| 14 | Connecting conduit |
| 15 | Ventilation muff |
| 16 | Pre-squeezer roller |
| 17 | Squeezer roller |
| 18 | |
| 19 | |
| 20 | Calibration basket |
| 21 | Flattening unit |
| 22 | Pre-squeezer |
| 23 | Squeezer |
| 24 | Device for transport and chilling |
| 25 | Roller |
| 25' | Position of the roller |
| 26 | Direct path |
| 27 | |
| 28 | |
| 29 | |
| 30 | Frame |
| 31 | Wheel |

-continued

| List of Reference Symbols | |
|---|---|
| 32 | Deflecting guide roller |
| 33 | Cross beam |
| 34 | |
| 35 | |
| A | Double arrow |
| z | Direction of transport |

What is claimed is:

1. A device for transportation of a film tube, comprising:
   at least one first film guide element;
   at least one second film guide element; and
   at least one third film guide element to guide the film tube such that the film tube can discharge heat to an environment thereof in an area between the first film guide element and at least one of the second film guide element and the third film guide element,
   the third film guide element
   (i) being adjustable relative to the first film guide element and the second film guide element such that the film tube can be deflected from a direct path between the first film guide element and the second film guide element, so that a path length traversed by the film tube between the first film guide element and the second film guide element is variable, and
   (ii) including at least two rollers each rotatably mounted in a holder that is rotatably mounted in a frame, each of the rollers being both transversely and longitudinally displaceable relative to the first film guide element and the second film guide element as an angle of rotation of the holder is varied within the frame,
   the first, the second, and the third film guide elements each having an axis of rotation that is parallel to each other of the film guide elements.

2. The device according to claim 1, wherein the distance between the first film guide element and the second film guide element is continuously variable.

3. The device according to claim 1, wherein the first film guide element is an integral part of a first roller pair, and through a clearance between said first roller pair the film tube enters into a chilled area, and
   the second film guide element is an integral part of a second roller pair, and through a clearance between said second roller pair the film tube leaves the chilled area.

4. The device according to claim 1, further comprising a drive to rotate the holder.

5. The device according to claim 1, wherein the holder is configured as a rotary wheel.

6. The device according to claim 1, wherein at least one of the first, the second, and the third film guide elements is configured as a chill roller.

7. The device according to claim 1, wherein the third film guide element is adjustable relative to the first film guide element such that a transport path of the film tube is increased relative to the direct path between the first film guide element and the second film guide element so as to provide for increased heat discharge from the film tube.

\* \* \* \* \*